United States Patent [19]
Martel et al.

[11] 3,884,927
[45] May 20, 1975

[54] PROCESS FOR THE PREPARATION OF VINCAMINE

[75] Inventors: Jacques Martel, Bondy; Germain Costerousse, Vernouillet, both of France

[73] Assignee: Rousell Uclaf, Paris, France

[22] Filed: Mar. 27, 1973

[21] Appl. No.: 345,255

[30] Foreign Application Priority Data
Apr. 14, 1972 France .............................. 72.13135

[52] U.S. Cl. ............................................ 260/293.53
[51] Int. Cl. ............................................. C07d 57/08
[58] Field of Search ................................. 260/293.53

[56] References Cited
UNITED STATES PATENTS
3,542,796   11/1970   Schut .................................. 260/295
3,753,995   8/1973   Martel et al. ................... 260/293.53
3,755,333   8/1973   Szantay et al. .................. 260/293.53
3,770,724   11/1973   Warnant et al. ............... 260/239.3 P FOREIGN PATENTS OR APPLICATIONS
772,005   12/1971   Belgium
772,006   12/1971   Belgium OTHER PUBLICATIONS
Morrison et al., "Organic Chemistry, 2nd Edition," Allyn and Bacon, Inc., Boston (1966), p. 267.

*Primary Examiner*—G. Thomas Todd
*Attorney, Agent, or Firm*—Bacon & Thomas

[57]  ABSTRACT

Process for the preparation of vincamine wherein eburnamonine is reacted with an ethynylmagnesium halide to give [20α,21α] 16α-ethynyl eburnane 16β-ol, which upon oxidation to vincaminic acid and subsequent methylation provides vincamine. The optically active forms of vincamine can be obtained by using an optically active form of eburnamonine.

3 Claims, No Drawings

PROCESS FOR THE PREPARATION OF VINCAMINE

BACKGROUND OF THE INVENTION

1. Field of the Invention

The present invention concerns a novel process for the preparation of vincamine. More particularly, the invention concerns a process for the preparation of vincamine from eburnamonine.

2. Description of the Prior Art

It is known that (+)-vincamine has been isolated from several species of the genus Vinca, such as *Vinca minor L.* As for dl-vincamine, it would have been found in the species *Tabernaemontano rigida.* It is also well known that vincamine possess very interesting therapeutic properties thanks to a double action: on the one hand, it improves the oxygenation of the cerebral tissue, which contributes to maintaining the nervous tissue in good functioning condition; and on the other hand, it manifests a vasodilatory action, more particularly on the cerebral capillary system, which permits re-establishment or maintenance of normal blood flow. Vincamine is used especially in vascular cerebral complaints and cerebrosclerosis, loss of consciousness due to cranial traumas, or the after effects of acute cerebral insufficiency.

Syntheses of dl-vincamine have already been described. Thus, Kuehne, by treating the tetracyclic compound of formula A:

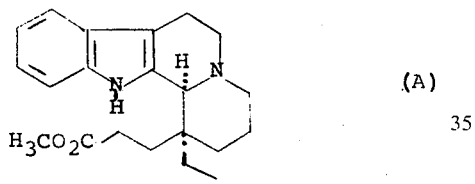

with p-nitrosodimethylaniline and triphenylmethyl sodium, then with hydrochloric acid, obtains a mixture of dl-vincamine and dl-epivincamine, from which dl-vincamine can only be isolated in very low yields. See J. Am. Chem. Soc. 86, 2946 (1964) and U.S. Pat. No. 3,454,583.

In addition, the conversion of dl-homo-eburnamonine into dl-vincamine, by a five-stage process, has recently been described; the starting material being itself accessible by quite a long process starting with tryptamine and 2-ethoxycarbonyl 2-ethyl cyclopentanone. See K. H. Gibson et al, Chem. Comm. (1969), pages 799 and 1,490.

After an important number of steps, these processes lead to a mixture of isomers. Moreover, a process for the preparation of racemic or optically active vincamine is described in Belgium Pat. No. 765,006.

There has now been found a novel method for the preparation of optically active or racemic vincamine.

SUMMARY OF THE INVENTION

The present invention provides a process for the preparation of vincamine, comprising:

a. reacting eburnamonine with an ethynylmagnesium halide to give [20α,21α] 16α-ethynyl eburnane 16β-ol;

b. reacting the [20α,21α] 16α-ethynyl eburnane 16β-ol; with an oxidizing agent to give vincaminic acid;

c. treating the vincaminic acid with a methylating agent to give vincamine; and d. isolating the vincamine.

The invention also provides such a process wherein the eburnamonine, the [20α,21α] 16α-ethynyl eburnane 16β-ol; and the vincaminic acid are optically active.

There is further described a process for the preparation of vincaminic acid which comprises:

reacting [20α,21α] 16α-ethynyl eburnane 16β-ol; with an oxidizing agent, and isolating the product. Where [20α,21α] 16α-ethynyl eburnane 16β-ol is optically active, optically active vincaminic acid is obtained.

DETAILED DESCRIPTION OF THE INVENTION

An object of the present invention is a process for the preparation of vincamine from eburnamonine, characterized by the reaction of eburnamonine with an ethynylmagnesium halide to give [20α,21α] 16α-ethynyl eburnane 16β-ol, which is then treated with an oxidising agent to give vincaminic acid, which is then treated with a methylating agent.

The process of the reaction is outlined below:

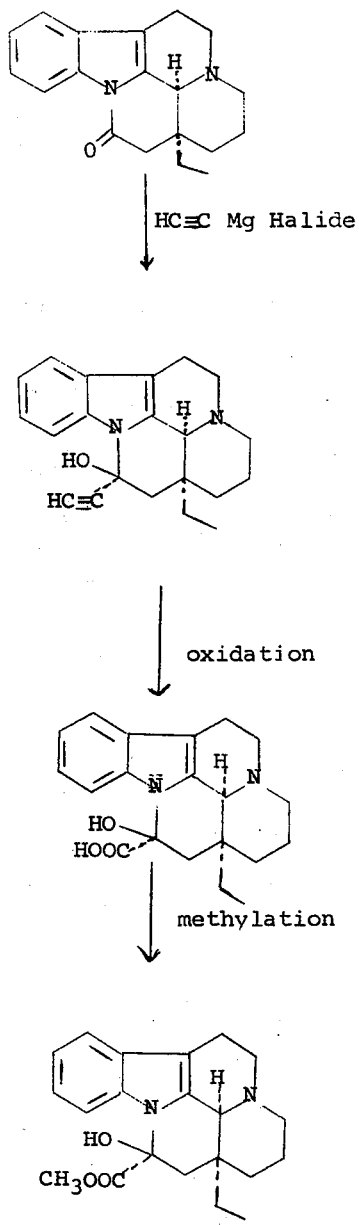

The process of the invention especially permits, in a selective fashion, the preparation of optically active vincamine. If effect, in starting from one of the optically active forms of [20α,21α] 16α-ethynyl eburnane 16β-ol, obtained from one of the optically active forms of eburnamonine, one is able to exclusively obtain (+)-vincamine or (−)-vincamine.

Thus, the present invention also has for an object a process for the preparation of optically active vincamine, characterized in reacting optically active eburnamonine with an ethynylmagnesium halide to provide an optically active form of [20α,21α] 16α-ethynyl eburnane 16β-ol, which upon treatment with an oxidising agent yields an optically active form of vincaminic acid, which is then treated with a methylating agent in order to provide an optically active form of vincamine.

In the preferred method of carrying out the process, the ethynylmagnesium halide is ethynylmagnesium bromide, the oxidising agent with which one reacts the [20α,21α] 16α-ethynyl eburnane 16β-ol is potassium permanganate, and the methylating agent with which one treats the vincaminic acid is diazomethane.

As an oxidising agent, it is also possible to use ozone, chromic anhydride, or peracetic acid.

As a methylating agent, one can also use methanol in the presence of a trace of a mineral or organic acid, such as hydrochloric acid, sulfuric acid or p-toluenesulfonic acid.

Within the scope of the process described above, the invention has equally for an object a process for the preparation of (+)-vincamine, characterized by reacting (−)-eburnamonine with ethynylmagnesium bromide in order to provide (+)-[20α,21α] 16α-ethynyl eburnane 16β-ol; which is reacted with potassium permanganate to give (+)-vincaminic acid, which is then treated with diazomethane in order to provide the desired (+)-vincamine.

The eburnamonine utilized as a starting material in the process can be prepared according to the method described by Bartlett et al, J. Am. Chem. Soc., 82, 5941 (1960). (+)-Eburnamonine and (−)-eburnamonine can be obtained by resolution of racemic eburnamonine according to the method described by Mokry et al, Coll. Czech. Chem. Comm., 28, 1309 (1963).

The following example illustrate the invention without, however, limiting it in any way.

Preparation Of (+)-Vincamine

Stage A: (+)-[20α,21α] 16α-Ethynyl Eburnane 16β-ol

To 250cc. of a 1N solution of ethynylmagnesium bromide in tetrahydrofuran, one adds dropwise, under an atmosphere of nitrogen, a solution of 3 grams of (−)-eburnamonine in 30cc. of tetrahydrofuran and heats the mixture under reflux for 20 hours. After cooling, one pours the mixture into a 5 percent aqueous ammonium chloride solution and extracts the resultant mixture with the aid of methylene chloride. The organic solutions are combined, washed with water, and dried over sodium sulfate. After evaporation, a crystalline product is obtained which is chromatographed on alumina. The product is eluted with chloroform and recrystallized from isopropyl ether to yield the desired (+)-[20α,21α] 16α-ethynyl eburnane 16β-ol in the form of light crystals, melting at 250°C which are soluble in chloroform and methylene chloride, slightly soluble in isopropyl ether, and insoluble in water.

Stage B: (+)-Vincaminic Acid

One dissolves 192mg. of (+)-[20α,21α] 16α-ethynyl eburnane 16β-ol in 15cc. of acetone. The solution is cooled to 0°C and a solution of 240mg. of potassium permanganate in 6cc. of water is added dropwise over a period of 30 minutes. The resulting mixture is stirred for 4 hours at 0°C. and then allowed to come to room temperature. The insoluble material is separated and washed with an acetone-water mixture (30:12). The filtrate is neutralized by the addition of acetic acid and concentrated to dryness under reduced pressure to yield (+)-vincaminic acid.

Stage C: (+)-Vincamine

The product obtained in stage B above, is dissolved in a mixture of 4cc. of methanol and 4cc. of methylene chloride. After solution is complete, 20cc. of a solution of diazomethane in methylene chloride is added at room temperature. The resultant reaction mixture is stirred for 30 minutes at ambient temperature, concentrated to dryness under reduced pressure, and the residue is taken up in chloroform. The resulting solution is filtered, concentrated to dryness, and the residue chromatographed on alumina. Elution with chloroform provides (+)-vincamine melting at 258°–260°C. $[\alpha]_D^{20} = +42°$ (c=1 percent, pyridine).

We claim:

1. A process for the preparation of vincamine, which comprises:
   a. reacting eburnamonine with an ethynylmagnesium halide to give [20α,21α] 16α-ethynyl eburnane 16β-ol;
   b. reacting the [20α,21α] 16α-ethynyl eburnane 16β-ol; with an oxidizing agent to give vincaminic acid;
   c. treating the vincaminic acid with a methylating agent to give vincamine; and
   d. isolating the vincamine.

2. The process of claim 1 wherein the eburnamonine, the [20α,21α] 16α-ethynyl eburnane 16β-ol; and the vincaminic acid are optically active.

3. The process of claim 2 wherein the vincamine is (+)-vincamine, the eburnamonine is (−)-eburnamonine, the [20α,21α] 16α-ethynyl eburnane 16β-ol is (+)-[20α,21α] 16α-ethynyl eburnane 16β-ol, the ethynylmagnesium halide is ethynylmagnesium bromide, the oxidizing agent is potassium permanganate, and the methylating agent is diazomethane.

* * * * *